(12) United States Patent
Agarwala et al.

(10) Patent No.: US 9,742,994 B2
(45) Date of Patent: *Aug. 22, 2017

(54) CONTENT-AWARE WIDE-ANGLE IMAGES

(71) Applicant: Adobe Systems Incorporated, San Jose, CA (US)

(72) Inventors: Aseem O. Agarwala, Seattle, WA (US); Robert E. Carroll, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 13/960,867

(22) Filed: Aug. 7, 2013

(65) Prior Publication Data
US 2013/0321569 A1  Dec. 5, 2013

Related U.S. Application Data

(63) Continuation of application No. 12/270,142, filed on Nov. 13, 2008, now Pat. No. 8,525,871.

(60) Provisional application No. 61/087,567, filed on Aug. 8, 2008.

(51) Int. Cl.
*H04N 5/232* (2006.01)
*G06T 3/00* (2006.01)
*G06T 5/00* (2006.01)

(52) U.S. Cl.
CPC ....... *H04N 5/23238* (2013.01); *G06T 3/0018* (2013.01); *G06T 5/006* (2013.01)

(58) Field of Classification Search
CPC .................................................. G06T 3/0018
USPC .......................................................... 348/36
See application file for complete search history.

(56) References Cited

U.S. PATENT DOCUMENTS

| | | |
|---|---|---|
| 5,999,660 A | 12/1999 | Zorin et al. |
| 6,005,611 A | 12/1999 | Gullichsen et al. |
| 6,369,814 B1 | 4/2002 | Dorbie |
| 7,950,849 B2 | 5/2011 | Claus et al. |
| 8,068,693 B2 | 11/2011 | Sorek et al. |
| RE43,490 E | 6/2012 | Gullichsen et al. |
| 8,194,936 B2 | 6/2012 | Abramoff et al. |
| 8,396,283 B2 | 3/2013 | Iihoshi et al. |

(Continued)

OTHER PUBLICATIONS

"Final Office Action", U.S. Appl. No. 12/270,142, (Oct. 18, 2012), 7 pages.

(Continued)

*Primary Examiner* — Douglas Blair
(74) *Attorney, Agent, or Firm* — Wolfe-SBMC

(57) ABSTRACT

This specification describes technologies relating to digital images. In general, one aspect of the subject matter described in this specification can be embodied in methods that include the actions of receiving a source wide-angle image; identifying one or more locally salient features of the source wide-angle image; calculating a mapping from the source wide-angle image to a two-dimensional mapped wide-angle image according to constraints using the identified one or more spatially variable salient features; and rendering the mapped wide-angle image using the calculated mapping such that the mapped wide-angle image reduces distortion of the locally salient features relative to the distortion of the source wide angle image.

20 Claims, 5 Drawing Sheets

(56) References Cited

U.S. PATENT DOCUMENTS

| | | | |
|---|---|---|---|
| 8,525,871 B2* | 9/2013 | Agarwala | G06T 3/0018 348/36 |
| 2005/0069195 A1 | 3/2005 | Uezono et al. | |
| 2008/0239107 A1 | 10/2008 | Cho | |
| 2009/0022422 A1 | 1/2009 | Sorek et al. | |
| 2009/0096790 A1 | 4/2009 | Wiedemann et al. | |
| 2010/0033551 A1 | 2/2010 | Agarwala et al. | |
| 2010/0061601 A1 | 3/2010 | Abramoff et al. | |
| 2012/0092341 A1 | 4/2012 | Oxaal | |

OTHER PUBLICATIONS

"Non-Final Office Action", U.S. Appl. No. 12/270,142, (Feb. 1, 2013), 6 pages.

"Non-Final Office Action", U.S. Appl. No. 12/270,142, (Feb. 22, 2012), 7 pages.

"Notice of Allowance", U.S. Appl. No. 12/270,142, (Apr. 29, 2013), 5 pages.

"Volume Anamorphosis Collection", Retrieved from <http://www-wdxo.com/intl/photo/dxo_optics_pro/optics_geometry_corrections/anamorphosis> on Feb. 27, 2009, (2009), 4 Pages.

Zelnik-Manor, et al., "Squaring the Circle in Panoramas", *Proceedings of the Tenth IEEE International Conference on Computer Vision*—vol. 2, (2005), 8 pages.

Zorin, et al., "Correction of Geometric Perceptual Distortions in Pictures", *Proceedings of the 22nd annual conference on Computer graphics and interactive techniques*, (1995), 11 pages.

* cited by examiner

CONTENT-AWARE WIDE-ANGLE IMAGES

RELATED APPLICATIONS

This application is a continuation of and claims priority to U.S. Utility patent application Ser. No. 12/270,142, filed on Nov. 13, 2008 which in turn claims priority under 35 U.S.C. §119(e) to U.S. Provisional Patent Application Ser. No. 61/087,567, filed on Aug. 8, 2008, the disclosure of which is hereby incorporated by reference herein in its entirety.

BACKGROUND

The present disclosure relates to digital images.

Image capture devices, e.g., cameras, can be used to capture an image of a section a field of view. Additionally, such image capture devices can have varying fields of view. The field of view captured by a particular camera depends in part on a focal length of the camera lens and a film size. A wide-angle lens has a focal length that is smaller than a normal lens (e.g., a lens having a focal length substantially equal to a diagonal length of the film size). For a constant film size, a wide angle lens captures a larger field of view relative to a lens with a larger focal length.

Any image captured by an input device often includes some distortions. For example, a camera can distort the sizes of objects depicted in the image so that distant objects appear smaller than closer objects. In particular, capturing an image results in a projection of the section of the view. This projection can vary depending on the viewpoint of the image capture device, which results in perspective distortion between the captured images.

Some wide-angle images provide rectilinear images having a large field of view (e.g., a 24 mm wide-angle lens for a 35 mm camera). Other wide-angle lenses do not provide a rectangular image, for example, some fisheye lenses. A fisheye lens provides a wide angle hemispherical image, which can be cropped to a traditional rectangular image.

Additionally, wide-angle lenses intrinsically generate additional distortions, particularly near the edges where, for example, lines that appear straight in the real world appear bent and circles stretch into ovals.

Another form of wide-angle image is a composite image (e.g., a panoramic image) formed from stitching together two or more component images. Thus, to generate an image of the larger view, multiple overlapping images of sections of views can be taken, and the images can be stitched together to form a composite image. The composite image can also include distortions including perspective distortions.

SUMMARY

This specification describes technologies relating to digital images.

In general, one aspect of the subject matter described in this specification can be embodied in methods that include the actions of receiving a source wide-angle image; identifying one or more locally salient features of the source wide-angle image; calculating a spatially variable mapping from the source wide-angle image to a two dimensional mapped wide-angle image using the identified one or more salient features; and rendering the mapped wide-angle image using the calculated mapping such that the mapped wide-angle image reduces distortion of the locally salient features relative to the distortion of the source wide angle image. Other embodiments of this aspect include corresponding systems, apparatus, and computer program products.

These and other embodiments can optionally include one or more of the following features. Receiving the source wide-angle image includes receiving one or more camera properties associated with the source wide-angle image and further including projecting the source wide-angle image to a surface of a sphere using the one or more camera properties. Identifying locally salient features includes detecting lines in the source wide-angle image. Identifying locally salient features includes detecting faces in the source wide-angle image. Calculating the mapping includes defining a linear system of descretized constraint equations as a function of local salience. The linear system defines conformality, line, and smoothness constraints. Calculating the mapping includes solving the constraint equations using a least-squares method. The method further includes storing the mapped wide-angle image.

Particular embodiments of the subject matter described in this specification can be implemented to realize one or more of the following advantages. A source wide-angle image can be mapped to a surface such that intrinsic camera distortions are reduced. Image content can be used to calculate an optimized mapping that varies for different image regions in order to reduce distortions of salient image content. The resultant mapped wide-angle image reduces distortion to provide a representation that more closely matches the corresponding real world view than the representation of the view provided by the source wide-angle image.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
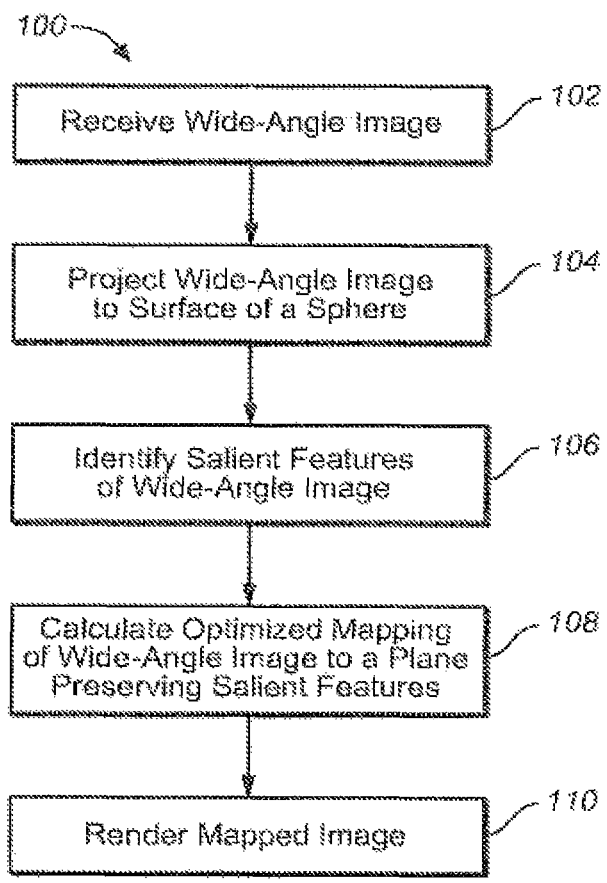
FIG. 1 is a flow chart of an example method for mapping a wide-angle image with reduced distortion.

FIG. 1 is a flow chart of an example method 100 for mapping a wide-angle image with reduced distortion. For convenience, the method 100 will be described with respect to a system that performs the method 100.

The system receives 102 a source wide-angle image. The source wide-angle image can be an image captured using a wide angle lens (e.g., a fisheye lens) or a composite image formed from two or more component images. The system can receive the source wide-angle image from a storage device, either locally or remotely. Additionally, the source wide-angle image can be retrieved in response to a user identification of an image (e.g., a user selection from a user interface). In some implementations, the source wide-angle image includes additional information (e.g., as metadata associated with the wide-angle image), for example, camera parameters associated with the source wide-angle image (e.g., focal length, camera angles).

Figure 2A:
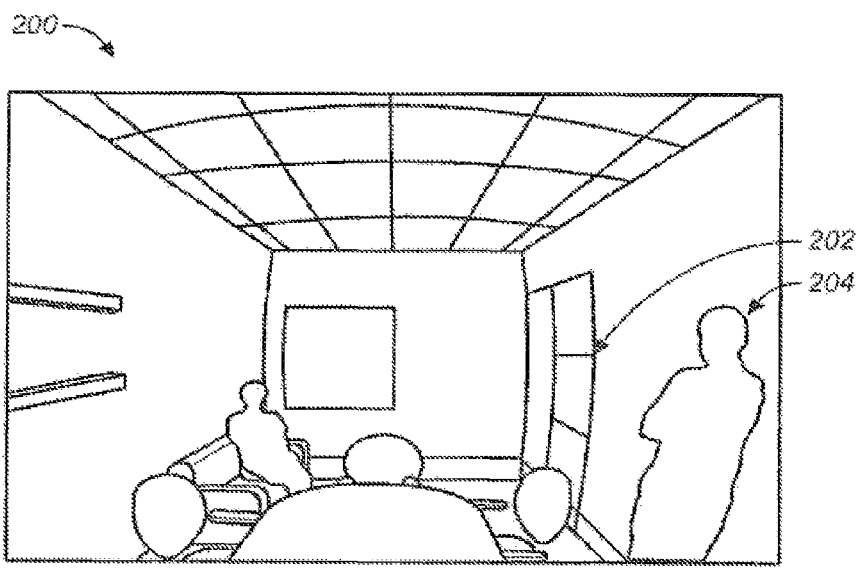
FIG. 2A is an example wide-angle image.

FIG. 2A is an example source wide-angle image 200. The source wide-angle image 200 is an image captured using a fisheye lens having a particular focal length. Additionally, the source wide-angle image 200 has been cropped to a rectangular image instead of a hemispherical image. Image distortions are visible within source wide-angle image 200. For example, distortions in wide-angle images include bending of straight lines, local stretching and shearing, changes in scale, and changes in orientation. For example, in the source wide-angle image 200, the vertical line representing the frame 202 of the windows is curved. Additionally, the foreground individual 204 is stretched in source wide-angle image 200. The stretching results from a non-uniform scaling (i.e., a scaling of greater magnitude along one direction compared to another direction). Non-uniform scaling is one way to lose conformality, which is described in greater detail below.

Figure 2B:
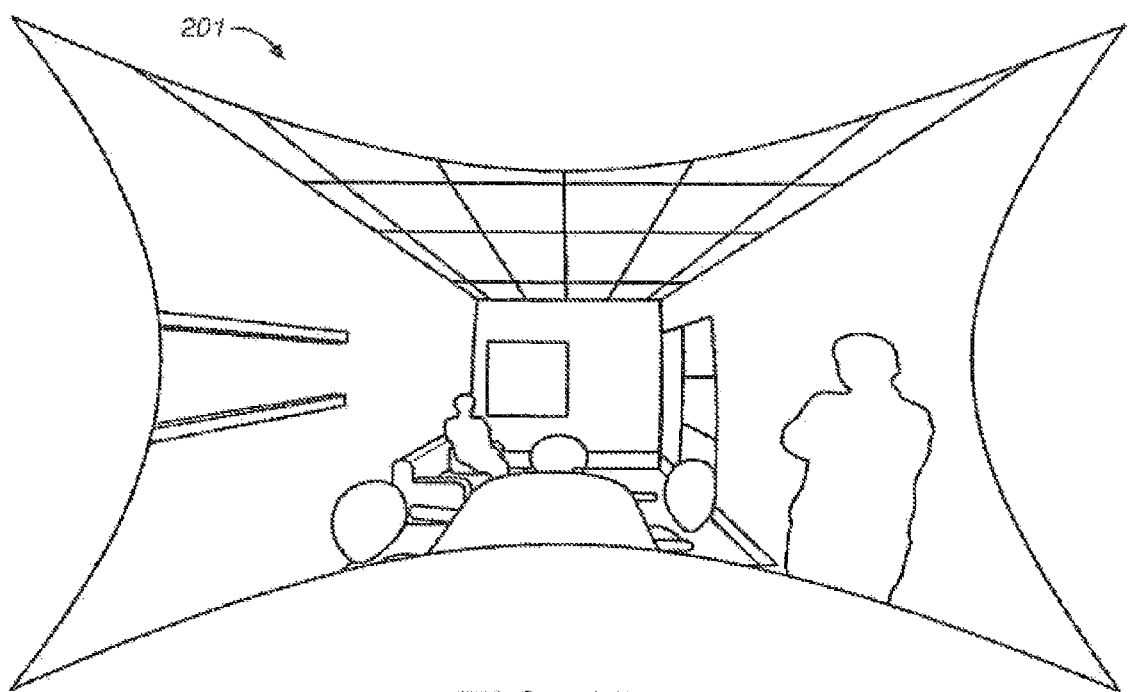
FIG. 2B is an example of another source wide-angle image.

FIG. 2B is an example of another source wide-angle image 201. The source wide-angle image 201 is a wide-angle rectilinear perspective image. Stretching distortions are clearly visible at the edges of the source wide-angle image 201.

The system projects 104 the received source wide-angle image to a surface of a sphere according to a specified spherical projection. The spherical transformation of the wide-angle image is a geometric transform that provides a transformation of the wide-angle image from a reference frame of the wide-angle image to a projected image on the surface of the sphere. In particular, the spherical transformation provides a transformation of the wide-angle image from a planar coordinate system (e.g., Cartesian x and y coordinates or planar polar coordinates radius, ρ and angle θ) to spherical coordinates identifying points on the spherical surface, or more particularly, geographic coordinates (e.g., longitude λ and latitude φ).

In some implementations, the system uses camera properties associated with the source wide-angle image, particularly focal length, to project the source wide-angle image to the surface of the sphere. In some alternative implementations, the system projects the source wide-angle image to a surface of a cylinder using a cylindrical projection.

For a spherical projection parameterized by λ and φ, each point on the image can be identified by in vector notation as $$\lambda = \begin{bmatrix} \lambda \\ \phi \end{bmatrix}.$$

The sphere can be descretized according to a uniform grid in the λ, φ space. The grid can be indexed by i and j, where i represents a step move (e.g., a specified number of pixels) in the λ direction and j represents a corresponding step in the φ direction. This results in a quad mesh on the surface of the sphere with each quad having dimensions depending on a particular range of i and j, e.g., 0<i<w, and 0<j<h. The variables w and h correspond to the number of steps in the quad mesh in the horizontal and vertical dimensions, which depends on the size of the input image.

Figure 3:
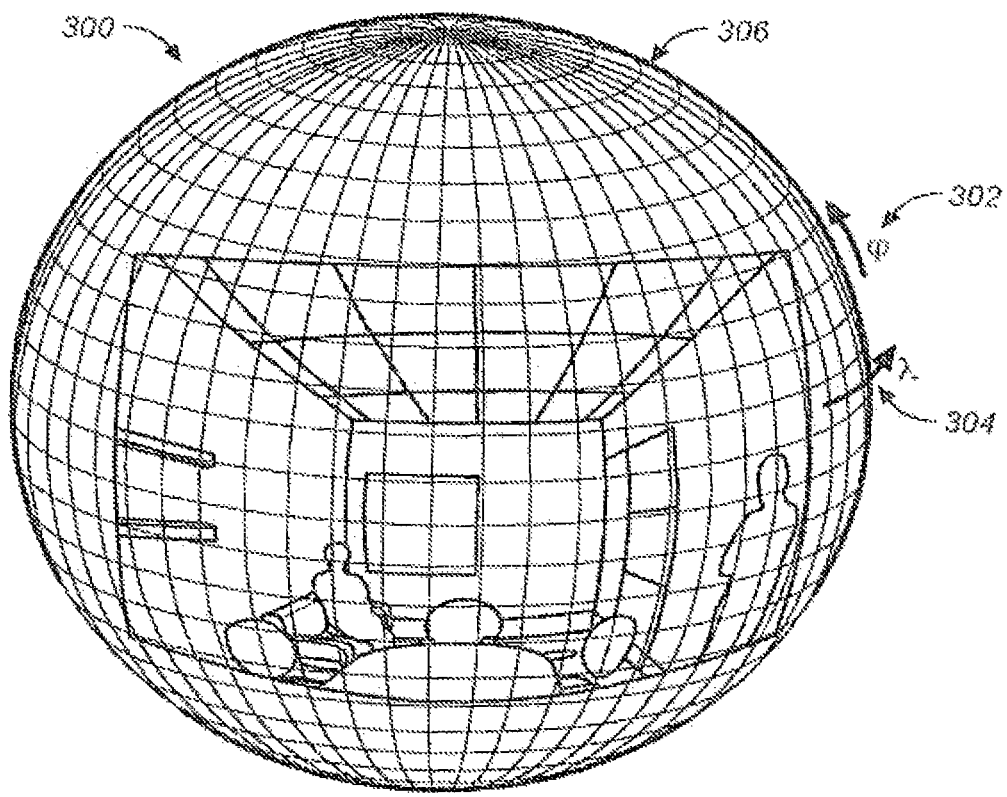
FIG. 3 is an example wide-angle image projected on a sphere.

FIG. 3 is an example projected wide-angle image 300 projected onto a sphere. Additionally, a grid 206 is represented on the surface of the sphere and projected wide-angle image 300. The grid 206 is shown having lines with respect to longitude φ 202 and latitude λ 204. Additionally, when projected onto the sphere, local portions of the wide angle image 300 are undistorted. For example, on the sphere, the image content (e.g., both individuals) is shown in a natural, undistorted form. Thus, the distortions shown in wide-angle image 100 of FIG. 1 are not present in the spherically projected wide-angle image 300.

The system identifies 106 salient features of the wide-angle image. The salient features are local features of the image that should not be distorted in a mapped two-dimensional wide-angle image. For example, identifying salient regions of the wide-angle image to preserve such as face shape/scale or lines to be maintained as straight. Similarly, other areas of the wide-angle image can be less salient. For example, an area representing a blank wall can be identified as less locally salient because a local distortion there would have little effect on the mapped two-dimensional wide-angle image. Additionally, high-contrast areas or sharp areas of an image can also identify salient features.

In some implementations, locally salient features are manually identified. For example, the system can display the wide-angle image and a user can identify faces in an image or lines to keep straight (e.g., by identifying endpoints of a line segment). In some other implementations, the salient features are automatically identified. For example, various line detection techniques can be used, e.g., a Hough-transform. Similarly, face detection techniques can be used to identify faces in images, which can then be identified as salient features.

The spherical projection of the wide-angle image is used to calculate a mapping from the sphere to a two dimensional plane, parameterized by u and v, based on the identified salient features. This mapped wide-angle image variably reduces the distortion presented in the source wide-angle image as a function of local salience. Each point on the mapped wide-angle image in the two-dimensional plane can be identified in vector notation as $$u = \begin{bmatrix} u \\ v \end{bmatrix}.$$

The system calculates 108 an optimized mapping of the wide-angle image to a two-dimensional plane that reduces distortions for salient features in the image. Specifically, the system identifies a mapping from points on the spherical surface, to points on the two-dimensional surface $u_{i,j}$. To calculate the mapping, the system attempts to satisfy particular differential equations that define a projection from the sphere to a two-dimensional plane. However, these equations generally cannot be satisfied at all points of the wide-angle image because of specified constraints. Thus, no global projection exists from the sphere to the two-dimensional plane without distortion. However, techniques can be used to calculate a spatially-varying mapping (also referred to as a spatially-varying projection) that closely satisfies constraints defined by the differential equations. For example, a least squares technique can be used to calculate a particular mapping that approximates a projection according to the differential equation constraints.

The differential equations that define projection constraints can be descretized to generate a system of linear equations having known variables for each point on the spherical surface, $(\lambda_{i,j}, \phi_{i,j}) \forall i,j$ and unknown variables, $(u_{i,j}, v_{i,j}) \forall i,j$, for each mapped point on the two-dimensional plane. This linear system is solved, as described in greater detail below; in order calculate the mapping of the wide-angle image having reduced distortions based on local image salience.

In some implementations, there are four particular constraints associated with the mapping from $\lambda$, $\phi$ to u, v space: conformality, lines, smoothness, and regularization, each of which will be described in turn. Constraint values can be modified to vary spatially according to local image salience. In particular, the descretized values of conformality, lines, and smoothness can vary according to salience.

Conformality describes a property that ensures that all angles on the spherical surface are locally preserved in the two-dimensional plane. Consequently, conformality ensures that there is no local shearing or non-uniform scaling of the image as a result of a projection from the sphere to the plane. Conformality can described generally according to the Cauchy-Riemann equations:

$$\frac{\partial u}{\partial \lambda} = \cos\phi \frac{\partial v}{\partial \phi};$$

$$\frac{\partial v}{\partial \lambda} = -\cos\phi \frac{\partial u}{\partial \phi}$$

A function that satisfies the Cauchy-Riemann equations, having a non-zero derivative, preserves angles. Thus, the Cauchy-Riemann equations represent a condition required for maintaining conformality. The Cauchy-Riemann equations are similar to those used for plane to plane mapping. However, the above formulation introduces the cos $\phi$ term because of the use of spherical coordinates where the lines of latitude are not uniform in size. The Cauchy-Riemann equations, which are defined over infinitesimal changes in distance due to the partial derivatives, can be descretized with respect to $\phi$, ii, and v to form linear constraint equations:

$$u_{i+1,j} - u_{i,j} - \cos\phi_{i,j}(v_{i,j+1} - v_{i,j}) = 0$$

$$v_{i+1,j} - v_{i,j} - \cos\phi_{i,j}(u_{i,j+1} - u_{i,j}) = 0$$

Identified salient features can be used to weight these constraints according to the local content of the wide-angle image. For example, to enforce stronger conformality to portions of the wide-angle image belonging to faces. The weighted form of the linear constraint equations can be expressed as:

$$W_{i,j}(u_{i+1,j} - u_{i,j} - \cos\phi_{i,j}(v_{i,j+1} - v_{i,j})) = 0$$

$$W_{i,j}(v_{i+1,j} - v_{i,j} - \cos\phi_{i,j}(u_{i,j+1} - u_{i,j})) = 0$$

where $W_{i,j}$ is a locally (spatially) varying salience based weighting. Alternatively, in some implementations, W is a fixed weight for all points. The values of cos $\phi$ and W are known in the linear constraints such that only the values of u and v are unknown.

Bending of straight line segments is a perceptible distortion common to image projections. The lines constraint controls the amount of bending generated for lines in the projection from the spherical surface to the two-dimensional plane. The line bending is more prevalent in particular types of wide-angle images (e.g., fisheye or cylindrical panorama images). Identified salient lines are those line segments which are straight (e.g., in the three-dimensional real world) and that should remain straight when projected onto the two-dimensional plane (e.g., as identified from lines in a rectilinear perspective image or as identified by arcs on the projected sphere). Application of the lines constraint varies spatially according to local salience, namely, points in the wide-angle image, in particular locations where lines are identified as features.

A line can be defined by any point on the line and a normal vector n from the line. According to the lines constraint, any point on the line $u_{i,j}$ will satisfy:

$$(u_{i,j} - \bar{u})^T n = 0,$$

Where $\bar{u}$ is the line midpoint. According to the constraint, for any point on a line projected to the two-dimensional plane, a projection of that point onto the normal vector of the line should be zero. Thus, the two-dimensional line is also constrained to being a straight line.

Figure 4:
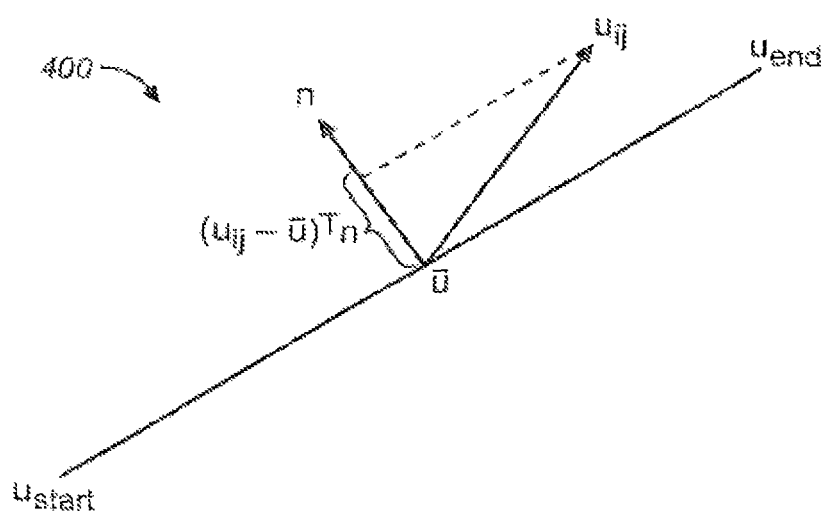
FIG. 4 is a diagram of an example line segment.

FIG. 4 is a diagram of an example line segment 400. Line segment 400 has a start point $u_{start}$, an end point $u_{end}$, a midpoint $\bar{u}$, and a normal vector n. Additionally, FIG. 4 illustrates the projection of a point $u_{i,j}$ to the normal vector n. The length of the projection on the normal vector to the line provides the distance of the point from the line and is defined by $(u_{i,j} - \bar{u})^T n$. Thus, if the point $u_{i,j}$ is on the line, this values is zero.

To maintain a linear system of equations using the line constraint, the orientations of the projected lines are determined. In some implementations, the system determines the orientations by selecting an orientation that the line would have in a rectilinear perspective image. In some other implementations, the orientation is taken from other projections.

The grid lines can be used to identify the projected line orientations. However, since the lines are discrete with some finite separations, the lines may not be aligned with vertices of the grid. If, instead, the line intersects a quad of the projected grid the system constrains a bilinearly interpolated point at the midpoint of the line-quad intersection. This modifies the line constraint to:

$$\left(au_1 + bu_2 + cu_3 + du_4 - \frac{1}{2}(u_{start} + u_{end})\right)^T n = 0,$$

where $(u_1, u_2, u_3, u_4)$ form a quad, and (a, b, c, d) are bilinear mapping coefficients such that a+b+c·d=1. Additionally, $$\bar{u} = \frac{1}{2}(u_{start} + u_{end})$$

midpoint of the line segment. The values of n and (a, b, c, d) are known leaving only the values for u and v as unknowns for the linear system.

The conformality and line constraints do not consider scale or rotation distortions in the projection. Consequently, the projection can change dramatically over the space of the image in order to conform to the other required constraints.

Figure 5:
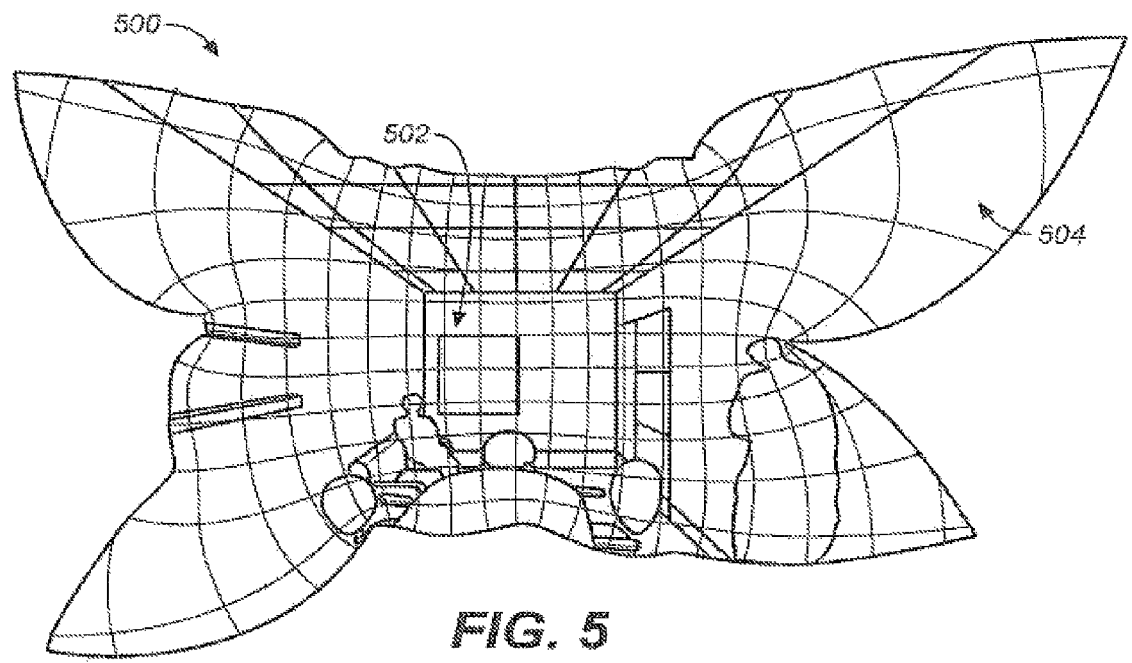
FIG. 5 is an example non-smoothed wide-angle image mapping.

FIG. 5 is an example non-smoothed wide-angle image projection 500. The wide-angle image 500, which has not been constrained with respect to scale or rotation shows grid lines intersecting at right angles, implying conformality. However, there are large changes in scale, in particular at the edges that are undesirable. For example, as shown in the wide-angle image projection 500, central quad 502 has a scale that is significantly different from quad 504 at an edge.

To constrain these distortion effects, smoothness constraints can be applied to unit vectors pointing along the meridians and parallels of the spherical surface. The unit vectors are referred to as h and k, respectively. More specifically, they are defined as:

$$h = \begin{bmatrix} \frac{\partial u}{\partial \phi} \\ \frac{\partial v}{\partial \phi} \end{bmatrix}$$

$$k = \frac{1}{\cos\phi} \begin{bmatrix} \frac{\partial u}{\partial \lambda} \\ \frac{\partial v}{\partial \lambda} \end{bmatrix}$$

To avoid abrupt changes in scale or rotation (e.g., to have h and k change slowly), h and k are constrained so that they should not change. The constraints are defined as:

$$\frac{\partial h}{\partial \phi} = \begin{bmatrix} \frac{\partial^2 u}{\partial \phi^2} \\ \frac{\partial^2 v}{\partial \phi^2} \end{bmatrix} = \begin{bmatrix} 0 \\ 0 \end{bmatrix}$$

$$\frac{\partial h}{\partial \lambda} = \begin{bmatrix} \frac{\partial^2 u}{\partial \phi \partial \lambda} \\ \frac{\partial^2 v}{\partial \phi \partial \lambda} \end{bmatrix} = \begin{bmatrix} 0 \\ 0 \end{bmatrix}$$

$$\frac{\partial k}{\partial \phi} = \sec\phi \tan\phi \begin{bmatrix} \frac{\partial u}{\partial \lambda} \\ \frac{\partial v}{\partial \lambda} \end{bmatrix} + \sec\phi \begin{bmatrix} \frac{\partial^2 u}{\partial \lambda \partial \phi} \\ \frac{\partial^2 v}{\partial \lambda \partial \phi} \end{bmatrix} = \begin{bmatrix} 0 \\ 0 \end{bmatrix}$$

$$\frac{\partial k}{\partial \lambda} = \sec\phi \begin{bmatrix} \frac{\partial^2 u}{\partial \lambda^2} \\ \frac{\partial^2 v}{\partial \lambda^2} \end{bmatrix} = \begin{bmatrix} 0 \\ 0 \end{bmatrix}$$

Since the equations may not always be satisfied, setting them equal to zero reduces the amount they can change when approximating a solution (e.g., when using a least squares technique to solve the system of linear equations). These constraints are again descretized for the linear system. In particular, they are descretized to form the following linear equations:

$$\frac{\partial k}{\partial \phi} = \sec\phi \tan\phi \begin{bmatrix} \frac{\partial u}{\partial \lambda} \\ \frac{\partial v}{\partial \lambda} \end{bmatrix} + \sec\phi \begin{bmatrix} \frac{\partial^2 u}{\partial \lambda \partial \phi} \\ \frac{\partial^2 v}{\partial \lambda \partial \phi} \end{bmatrix} = \begin{bmatrix} 0 \\ 0 \end{bmatrix}$$

$$\frac{\partial k}{\partial \lambda} = \sec\phi \begin{bmatrix} \frac{\partial^2 u}{\partial \lambda^2} \\ \frac{\partial^2 v}{\partial \lambda^2} \end{bmatrix} = \begin{bmatrix} 0 \\ 0 \end{bmatrix}$$

and $$\frac{\partial k}{\partial \phi} = \sec\phi_{i,j} \tan\phi_{i,j} \begin{bmatrix} u_{i+1,j} - u_{i-1,j} \\ u_{i+1,j} - u_{i-1,j} \end{bmatrix} +$$

-continued $$\sec\phi_{i,j} \begin{bmatrix} u_{i+1,j+1} - u_{i+1,j-1} - u_{i-1,j+1} + u_{i-1,j-1} \\ v_{i+1,j+1} - v_{i+1,j-1} - v_{i-1,j+1} + v_{i-1,j-1} \end{bmatrix} = \begin{bmatrix} 0 \\ 0 \end{bmatrix}$$

$$\frac{\partial k}{\partial \lambda} = \sec\phi_{i,j} \begin{bmatrix} u_{i-1,j} - 2u_{i,j} + u_{i-1,j} \\ u_{i-1,j} - 2u_{i,j} + u_{i-1,j} \end{bmatrix} = \begin{bmatrix} 0 \\ 0 \end{bmatrix}$$

These smoothness constraints can be weighted by a salience measure in a similar manner as the conformality constraint above. The smoothness weights can be spatially varying in the projection based on locally salience. For example, local salience with respect to smoothing can be identified for regions of high detail in the image e.g., in faces presented in an image. Other areas would have low salience, for example, a local region representing a blank wall where a rotation distortion would have little effect.

Since the values of φ are known, the only unknowns in the linear equations are again the projected values of u and v.

A regularization constraint an also be applied to the linear system. The regularization constraint is used to prevent the trivial solution of mapping of the wide-angle image to a single point. To prevent this possibility, the system can apply a weak Tikhonov regularization preferring a Mercator projection such that:

$W_{small}(u_{i,j} - M(\lambda_{i,j}, \phi_{i,j})) = 0$, where, $M(\lambda_{i,j}, \phi_{i,j})$ a Mercator projection and $W_{small}$ is very small (values can vary based on the weights applied to the other constraints and, more particularly, the weight W is small relative to the line weight, for example, a weight of 0.0001 can be applied relative to a line weight of 500). This regularization constraint prevents the trivial solution without significantly influencing the overall shape of the projection. In some implementations, other projections are used, for example, a stereographic projection.

The optimal mapping for the wide-angle image from the spherical surface to the u, v plane is calculated by solving the linear system of constraint equations. In particular, the linear equations are placed in the form of a matrix-vector equation. The unknowns (e.g., the $u_{i,j}$'s and the $v_{i,j}$'s) are arranged in a single column vector x. As a result, any of the linear constraint equations, $a_k$, can be written in the form $a_k x = b_k$ where $a_k$ is a row vector representing a particular constraint equation and $b_k$ is a scalar product of the vectors.

For example, the constraint equation for the conformality constraint having the linear equation $W_{i,j}(v_{i+1,j} - v_{i,j} - \cos\phi_{i,j}(u_{i,j+1} - u_{i,j})) = 0$ be written as the matrix-vector equation:

$$a_k x = \begin{bmatrix} 0 \\ 0 \\ \vdots \\ -W_{i,j} \\ W_{i,j}\cos\phi_{i,j} \\ W_{i,j} \\ 0 \\ \vdots \\ 0 \\ -W_{i,j}\cos\phi_{i,j} \\ \vdots \\ 0 \\ 0 \end{bmatrix}^T \begin{bmatrix} u_{1,1} \\ v_{1,1} \\ \vdots \\ u_{i,j} \\ v_{i,j} \\ u_{i+1,j} \\ v_{i+1,j} \\ \vdots \\ u_{i,j+1} \\ v_{i,j+1} \\ \vdots \\ u_{w,h} \\ v_{w,h} \end{bmatrix} = 0 = b_k$$

where the row-vector of knowns, $a_k$, is written as the transpose of a column-vector for compactness. Each of the linear constraint equations can be written in the $a_k x = b_k$ form.

Thus, if each $a_k$, corresponding to a particular linear constraint, is stacked into a matrix A and the corresponding $b_k$ scalars into a vector b, the linear system can be expressed as:

$$Ax = \begin{bmatrix} \leftarrow & a_1 & \rightarrow \\ & \vdots & \\ \leftarrow & a_n & \rightarrow \end{bmatrix} \begin{bmatrix} u_{1,1} \\ v_{1,1} \\ \vdots \\ u_{w,h} \\ v_{w,h} \end{bmatrix} = \begin{bmatrix} b_1 \\ \vdots \\ b_n \end{bmatrix} = b$$

The resulting matrix form of the linear system is over determined since the matrix has more rows than columns. However, the values for u, v can be calculated using a least-squares solution by forming the normal equation $A^T Ax = A^T b$, which when solved for x results in:

$$x = (A^T A)^{-1} A^T b.$$

The solution for x can be calculated using standard mathematical techniques including one or more computer applications. For example, using a "\" operator in Matlab® provided by The MathWorks, Inc. can be used to solve for x. Thus, it is not necessary to explicitly invert the matrix $A^T A$. The values for x can be efficiently computed because while $A^T A$ is large, it is sparse with a small number of non-zero entries per row. The solution for x provides all of the U and v values necessary to render the wide-angle image mapped to the two-dimensional plane according to the constraints, where the constraints are content-aware, e.g., the constraints account for variable salience in the image. Thus, for each image point coordinate on the spherical surface, $\lambda_{i,j}$, $\phi_{i,j}$, a particular mapped coordinate $u_{i,j}$; $v_{i,j}$ can be calculated to generate the mapped wide-angle image.

As shown in FIG. 1, the system renders 110 the mapped wide-angle image. In particular, the solution to x is used to identify the coordinates in the two-dimensional plane that correspond to λ, φ coordinates in the spherically projected wide-angle image. Additionally, since the solution to x is based on constraints that account for local salience in the image (e.g., the constraints are content-aware), the mapped wide-angle image has reduced distortion based on salience.

In some implementations, the rendering includes scaling the solution to a particular size and scan-rendering each quad of the resultant u, v grid. The resolution of image texture is independent of the linear system of equations. Therefore, a high resolution rendering can be generated from a relatively small system. In some implementations, image textures are rendered using bilinear mapping from an output quad to an associated input quad.

Figure 6:
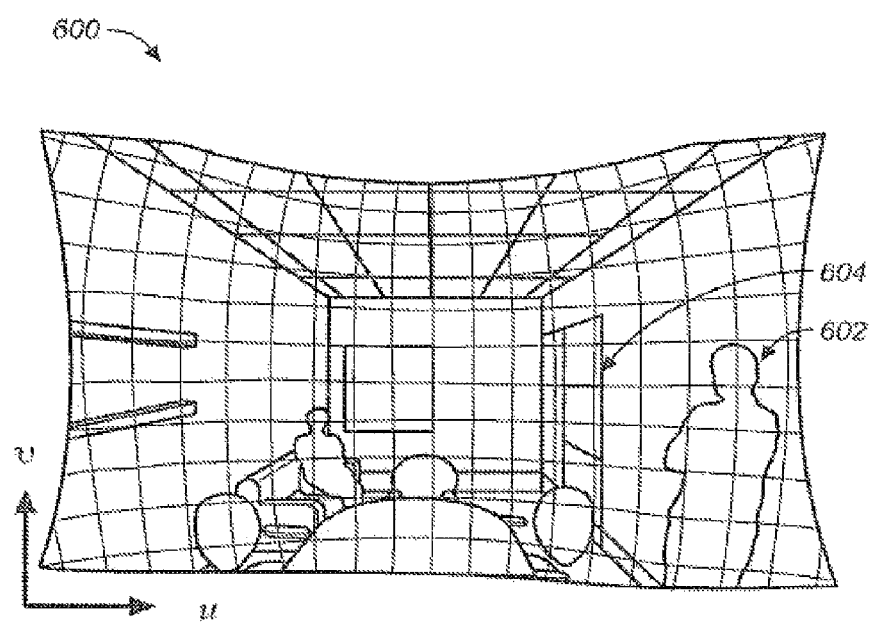
FIG. 6 is an example mapped wide-angle image.

FIG. 6 is an example mapped wide-angle image 600. The mapped wide-angle image 600 is a wide-angle image mapped to a two-dimensional plane according to an optimized mapping that reduces distortions from the source wide-angle image (e.g., wide-angle image 200 from FIG. 2). In particular, the optimized mapping is content-aware such that particular salient features of the wide-angle image are identified and used to constrain the mapping such that distortions are reduced.

For example, in mapped wide-angle image 600 includes an undistorted individual 602, which corresponds to a distorted individual 204 in the source wide-angle image 200 of FIG. 2. Similarly, lines that were bent in the source wide-angle image 200 are straight in the mapped wide-angle image 600 (e.g., line 202 in source wide-angle image 200 is bent while the corresponding line 604 is straight).

Figure 7:
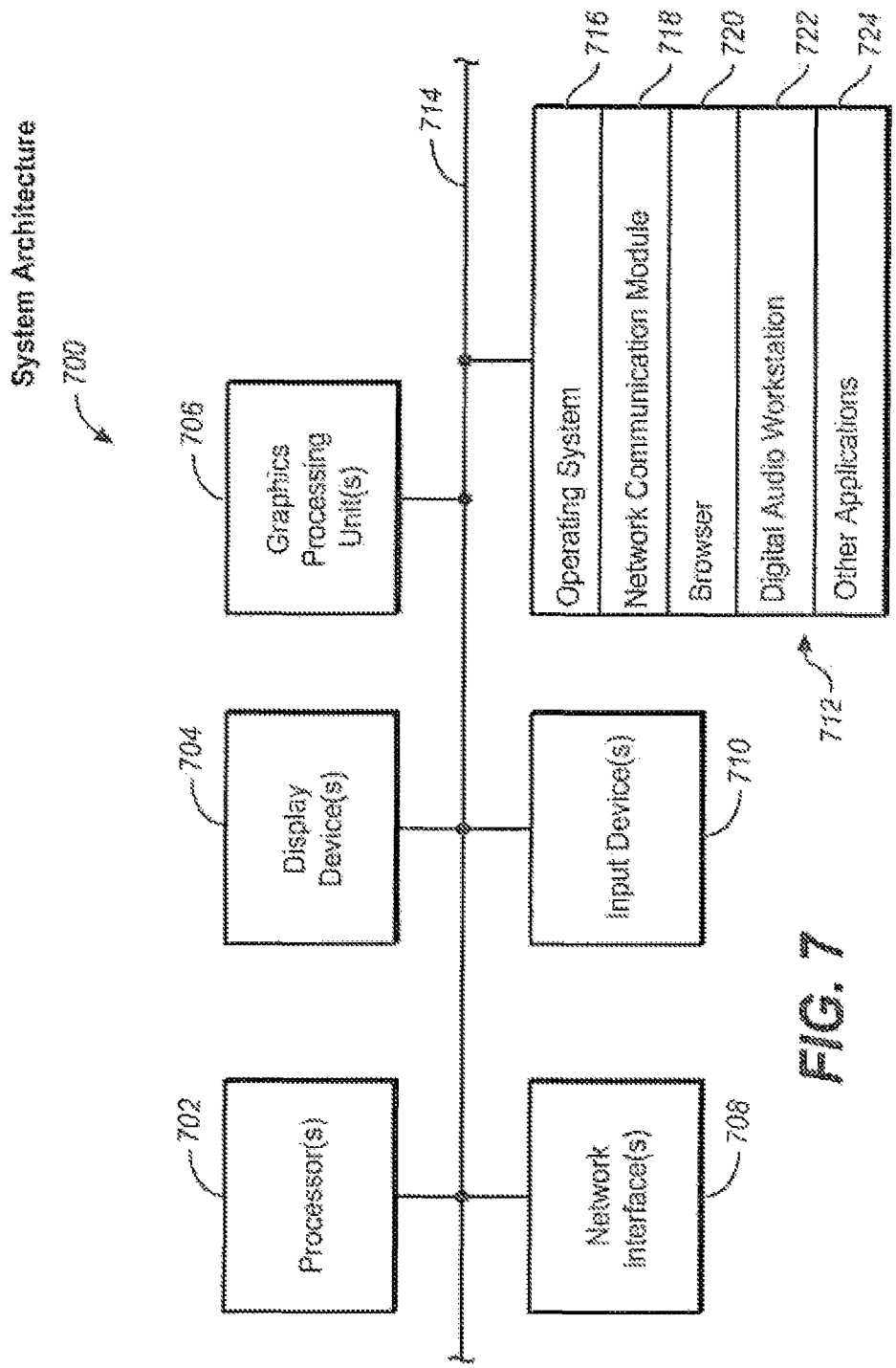
FIG. 7 is a block diagram of an exemplary user system architecture. Like reference numbers and designations in the various drawings indicate like elements.

FIG. 7 is a block diagram of an exemplary user system architecture 700. The system architecture 700 is capable of hosting an audio processing application that can electronically receive, display, and edit one or more audio signals. The architecture 700 includes one or more processors 702 (e.g., IBM PowerPC, Intel Pentium 4, etc.), one or more display devices 704 (e.g., CRT, LCD), graphics processing units 706 (e.g., NVIDIA GeForce, etc.), a network interface 708 (e.g., Ethernet, FireWire, USB, etc.), input devices 710 (e.g., keyboard, mouse, etc.), and one or more computer-readable mediums 712. These components exchange communications and data using one or more buses 714 (e.g., EISA, PCI, PCI Express, etc.).

The term "computer-readable medium" refers to any medium that participates in providing instructions to a processor 702 for execution. The computer-readable medium 712 further includes an operating system 716 (e.g., Mac OS®, Windows®, Linux, etc.), a network communication module 718, a browser 720 (e.g., Safari®, Microsoft®. Internet Explorer, Netscape®, etc.), an imaging application 722, and other applications 724.

The operating system 716 can be multi-user, multiprocessing, multitasking, multithreading, real-time and the like. The operating system 716 performs basic tasks, including but not limited to: recognizing input from input devices 710; sending output to display devices 704; keeping track of files and directories on computer-readable mediums 712 (e.g., memory or a storage device); controlling peripheral devices (e.g., disk drives, printers, etc.); and managing traffic on the one or more buses 714. The network communications module 718 includes various components for establishing and maintaining network connections (e.g., software for implementing communication protocols, such as TCP/IP, HTTP, Ethernet, etc.). The browser 720 enables the user to search a network (e.g., Internet) for information (e.g., digital media items).

The imaging application 722 provides various software components for performing the various functions for identifying salient content from a wide-angle image, calculating a mapping for the wide-angle image using the salient content, and rendering a corrected image, as described with respect to FIGS. 1-6.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method for reducing distortion in a source wide-angle image, captured using a wide-angle lens, to produce a two-dimensional mapped wide-angle image, the method comprising:

calculating, with a processor, a spatially variable mapping, from the source wide-angle image to the two-dimensional mapped wide-angle image, using an identified one or more locally salient features to be rendered undistorted in the two-dimensional mapped wide-angle image, the calculating comprising:

determining one or more weighted constraints, the weighted constraints based on the identified one or more locally salient features;

defining a linear system of descretized constraint equations as a function of local salience of the one or more locally salient features;

variably modifying the weighted constraints to solve the descretized constraint equations; and rendering, by the processor and using the calculated spatially variable mapping, the two-dimensional mapped wide-angle image, the rendered two-dimensional mapped wide-angle image having reduced distortion relative to the source wide-angle image.

2. The method of claim 1, further comprising:

identifying in the source wide-angle image, the one or more locally salient features.

3. The method of claim 2, wherein identifying locally salient features includes detecting lines in the source wide-angle image.

4. The method of claim 2, wherein identifying locally salient features includes detecting faces in the source wide-angle image.

5. The method of claim 1, further comprising:

storing the two-dimensional mapped wide-angle image.

6. The method of claim 1, wherein the source wide-angle image includes one or more camera properties associated with the source wide-angle image and the method further comprising:

projecting the source wide-angle image to a surface of a sphere using the one or more camera properties; and calculating the spatially variable mapping using the projection.

7. The method of claim 1, wherein the linear system defines conformality, line, smoothness, and regularization constraints.

8. The method of claim 1, wherein calculating the mapping includes solving the constraint equations using a least-squares method.

9. One or more non-transitory computer-readable storage media having processor-executable instructions thereon for reducing distortion in a source wide-angle image to produce a two-dimensional mapped wide-angle image that, responsive to execution by one or more processors, performs operations comprising:

calculating a spatially variable mapping, from the source wide-angle image to the two-dimensional mapped wide-angle image, using an identified one or more locally salient features, the calculating comprising:

determining one or more weighted constraints, the weighted constraints based on the identified one or more locally salient features;

defining a linear system of descretized constraint equations as a function of local salience of the one or more locally salient features;

variably modifying the weighted constraints to solve the descretized constraint equations; and rendering, using the calculated spatially variable mapping, the two-dimensional mapped wide-angle image.

10. The one or more non-transitory computer-readable storage media of claim 9, the operations further comprising:

identifying, in the source wide-angle image, the one or more locally salient features to be rendered undistorted in the two-dimensional mapped wide-angle image.

11. The one or more non-transitory computer-readable storage media of claim 10, wherein identifying locally salient features includes detecting lines in the source wide-angle image.

12. The one or more non-transitory computer-readable storage media of claim 10, wherein identifying locally salient features includes detecting faces in the source wide-angle image.

13. The one or more non-transitory computer-readable storage media of claim 9, the operations further comprising:

storing the two-dimensional mapped wide-angle image.

14. The one or more non-transitory computer-readable storage media of claim 9, wherein the source wide-angle image includes the one or more camera properties associated with the source wide-angle image and the operations further comprising:

projecting the source wide-angle image to a surface of a sphere using one or more camera properties; and calculating the spatially variable mapping using the projection.

15. The one or more non-transitory computer-readable storage media of claim 9, wherein the linear system defines conformality, line, smoothness, and regularization constraints.

16. The one or more non-transitory computer-readable storage media of claim 9, wherein calculating the mapping includes solving the constraint equations using a least-squares method.

17. A system comprising:

one or more processors;

memory, coupled to the one or more processors, comprising instructions for correcting distortion in a source wide-angle image to produce a two-dimensional mapped wide-angle image, the instructions executable by the one or more processors to perform:

calculating a spatially variable mapping, from a first region and a second region of the source wide-angle image to a corresponding first region and a corresponding second region of the two-dimensional mapped wide-angle image, using an identified one or more locally salient features to be rendered undistorted in each region of the two-dimensional mapped wide-angle image, the calculating for each region comprising:

determining, for each region, one or more weighted constraints, the weighted constraints based on the identified one or more locally salient features;

defining, for each region, a linear system of descretized constraint equations as a function of local salience of the one or more locally salient features;

variably modifying, for each region, the weighted constraints to solve the descretized constraint equations; and rendering, using the calculated spatially variable mapping, the two-dimensional mapped wide-angle image.

18. The system of claim 17, wherein the spatially variable mapping of the first region is different than the spatially variable mapping of the second region.

19. The system of claim 17, the instructions further executable to perform:

storing the two-dimensional mapped wide-angle image.

20. The system of claim 17, wherein the source wide-angle image includes one or more camera properties associated with the source wide-angle image and the method further comprising:

projecting the source wide-angle image to a surface of a sphere using the one or more camera properties; and calculating the spatially variable mapping using the projection.

* * * * *